United States Patent Office 3,154,177
Patented Oct. 27, 1964

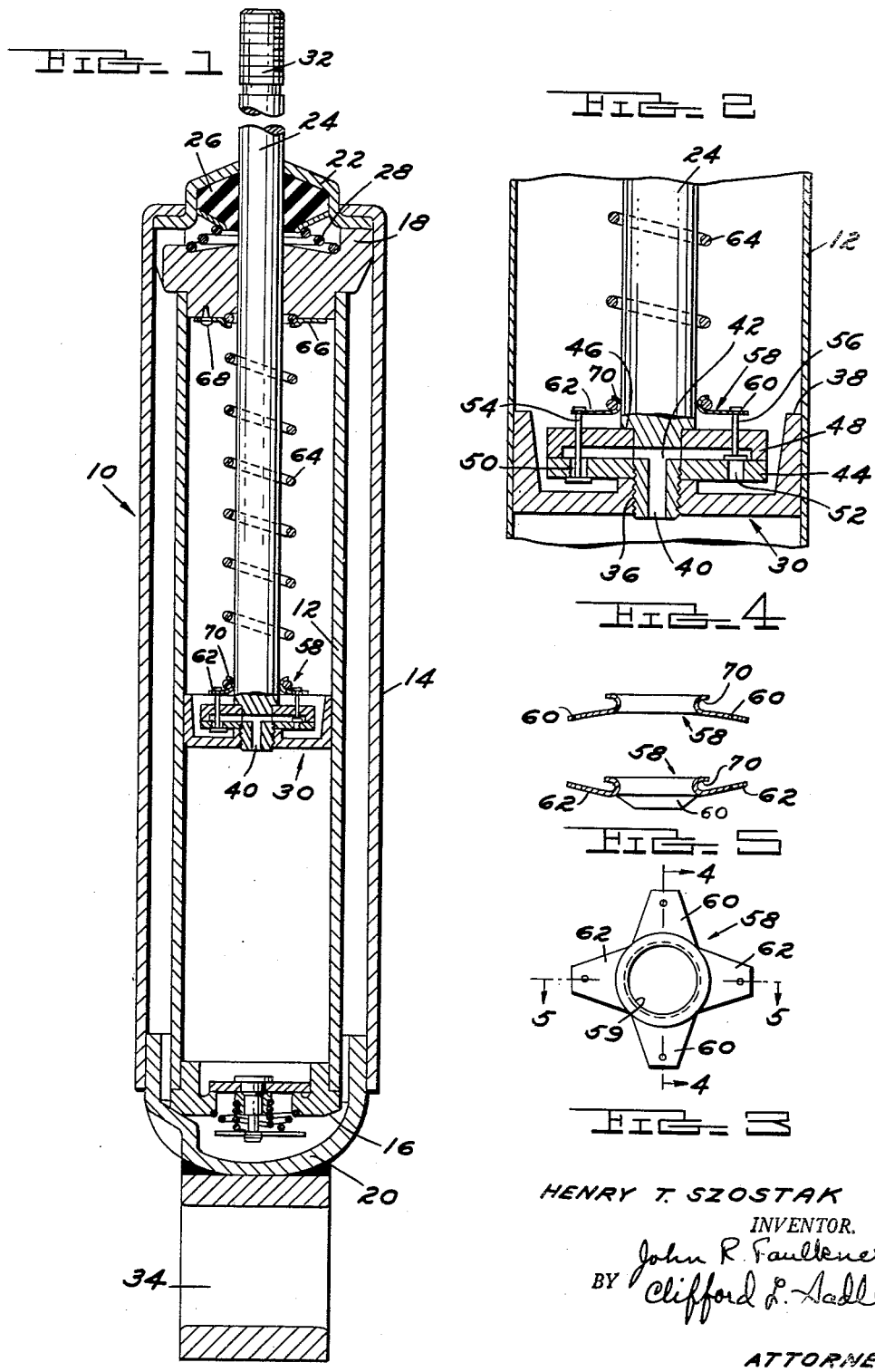

3,154,177
TELESCOPIC HYDRAULIC SHOCK ABSORBER HAVING SPRING BIASED JOUNCE AND REBOUND VALVES
Henry T. Szostak, Orange, Calif., assignor to Ford Motor Company, Dearborn, Mich., a corporation of Delaware
Continuation of application Ser. No. 14,064, Mar. 10, 1960. This application Jan. 2, 1962, Ser. No. 163,844
9 Claims. (Cl. 188—88)

This application is a continuation of my pending application Serial Number 14,064, filed March 10, 1960, and entitled Shock Absorber (now abandoned).

The present invention relates to shock absorbers and more particularly to a hydraulic shock absorber of the plunger type which is position sensitive in its dampening action.

The conventional automotive type hydraulic shock absorber will exhibit a nearly uniform resistance to movement regardless of the amount of deflection of the sprung and unsprung components of the vehicle with which it is associated. Such a shock absorber is satisfactory for normal operation; however, where maximum jounce and rebound deflection are encountered, it is a recognized advantage to have a shock absorber which will provide increased resistance to movement when the shock absorber is in its extreme position.

Therefore, it is an object of the present invention to provide a shock absorber of moderate control when functioning in its median range but which will have greater dampening power when the shock absorber is deflected toward either maximum jounce or maximum rebound position.

More specifically, the present invention provides a hydraulic shock absorber having spring pressed jounce and rebound blow-off valves which are located in the piston of the shock absorber and controlled by a spring having one end affixed to the head of the pressure tube.

These and further objects of the present invention will become more apparent from the following description and accompanying drawings in which:

FIGURE 1 is a side elevational view in section of a shock absorber embodying this invention, FIGURE 2 is an enlarged view showing the piston construction of the shock absorber of FIGURE 1, FIGURE 3 is a plan view of the preload spring, and FIGURES 4 and 5 are sectional views taken along section lines 4—4 and 5—5 of FIGURE 3.

Referring now to the drawings for a more detailed description, FIGURE 1 discloses a shock absorber 10 constructed in accordance with this invention. The shock absorber 10 is provided with concentric cylindrical pieces including an inner pressure tube 12 and a reservoir tube 14. The pressure tube 12 is closed at the bottom by a foot valve assembly 16 and at the top by a closure member 18. Member 18 also engages the upper end of the reservoir tube 14. A cup shaped piece 20 is welded inside the bottom of the reservoir tube 14 and positions it relative to the pressure tube 12.

At the top end of the unit a washer shaped member 22 is secured by welding to the upper end of the tube 14. The closure member 18 and the washer 22 are apertured to receive a piston rod 24 in sliding sealed engagement. A rubber seal 26 of doughnut shape is positioned about the piston rod 24 and held tightly up against the washer piece 22 by a coil spring 28 which is interposed between it and the closure member 18. The lower end of the piston rod 20 threadably engages a valved piston assembly 30.

The upper end of the piston rod 24 is threaded at 32 for engagement with a bushing assembly that secures that portion of the shock absorber 10 to the sprung mass of a vehicle. A ring 34 is welded to the lower end of the cap 20 for affixing to an unsprung component of the vehicle.

The unit thus far described corresponds to a conventional shock absorber. The tube 12 is filled with hydraulic fluid and the annular space defined between the tubes 12 and 14 is partially filled with fluid. As the valved piston assembly 30 reciprocates within the tube 12, resistance is provided by the foot valve 16 which opens and closes for the transmittal of fluid between the interior of the pressure tube 12 and the reservoir tube 14 in accordance with the volume displaced by the piston rod 24. The particular characteristics of the spring pressed valve assembly 16 control the ease with which that flow of fluid takes place. The resistance to the flow of fluid through the foot valve 16 in turn affects the ease with which the piston assembly 30 moves against the fluid contained within the pressure tube 12.

In addition to the action of foot valve 16, means are provided for the controlled passage of fluid through the valves of piston assembly 30. Referring to FIGURE 2, the valved piston assembly 30 includes the lower end of the piston rod 24 which is threaded at 36 to receive a piston element 38. The end of the piston rod 24 has an axial passageway 40 drilled therein which terminates in a diametral passageway 42. Fitted over the piston 38 is a valve seat disk 44. Positioned between a shoulder 46 provided on the piston rod 24 and the disk 44 is a cup shaped member 48. The area defined between the cup shaped member 48 and the disk 44 is in communication with the diametral passageway 42.

The disk 44 is provided with four passageways, two being compression blow-off orifices 50 and two being rebound blow-off orifices 52. The holes 50 and 52 are positioned alternately 90° apart. However, for purposes of illustration they are shown in FIGURES 1 and 2 as being 180° apart.

A poppet valve element 54 is associated with each of the compression blow off holes 50 and is seated against the disk 44. A pair of poppet valves 56 close the rebound blow off holes 52. A star shaped spring 58 formed of sheet metal and having four radially extending tabs has its extremities secured to the upper ends of the poppet valve elements 54 and 56. A central hole 59 is provided in the spring 58 so that it may be positioned concentrically about the piston rod 24 and slide freely relative thereto. The spring 58 has a pair of opposed tabs 60 which are normally bent downwardly and engage the rebound blow off poppet valves 56. Located 90° away from the tabs 60 are a second pair of diametral tabs 62 which are normally bent upwardly and are affixed to the upper end of the compression blow off poppet valves 54.

As seen in FIGURE 2 when the spring 58 is positioned to hold the four poppet valves 54 and 56 it assumes a flat configuration. However, the natural tendency of the tabs 60 to bend downwardly spring presses the poppet valves 56 into a closed condition. Similarly, the upward curvature of the tabs 62 tend to pull the poppet valves 54 upwardly into a closed condition.

An elongated coil spring 64 is interposed between star spring 58 and the closure member 18. A retainer 66 secures the upper end of the spring 64 and is held in place by means such as a machine screw 68. The lower end of spring 64 is held by a circular groove 70 which is formed on the inner edge of spring 58.

The shock absorber 10 as thus described provides a dampening unit which is position sensitive for a variable blow off pressure. In addition to the control provided by the foot valve assembly 16, the spring pressed valves 54 and 56 also control the dampening action of the shock absorber 10.

Spring 64 is selected of sufficient normal length so that when the vehicle with which the shock absorber unit 10 is associated is resting at design height the spring 64 will be in a neutral condition of neither tension nor compression. The poppet valves 54, 56 will be held closed by reason of the springiness of the tabs 62, 60, respectively. If the vehicle wheels should strike a bump during operation causing the shock absorber 10 to go into a jounce or compression stroke, the piston assembly 30 will travel downwardly towards the valve assembly 16 and the spring 64 will be extended. The extension of coil spring 64 will tend to pull the star spring 58 upwardly. This movement will be transmitted through the tab 62 to the compression blow off poppet valves 54 as a greater closing force. As the piston assembly moves downwardly fluid under pressure will pass through the passageways 40, 42 into the area between the disk 44 and cup shaped member 48. This pressure fluid will be acting upon the poppet valves 54 tending to cause them to open. However, they will not open until the pressure is sufficient to counteract the forces exerted by the extension of spring 64 and the springiness of the tab 62. When the piston assembly 30 is in a full jounce position and the spring 64 is fully extended the greatest spring force will be exerted on the poppet valves 54 tending to keep them closed. This means that even greater forces or fluid pressure is required to open the ports 50. Thus the farther the piston 30 is deflected during a compression stroke, the greater is the resistance to further deflection. That resistance is roughly proportional to the extent that the spring 64 is extended.

Just prior to the starting of the compression stroke the tab 60 holds the poppet valves 56 in a seated condition against the rebound blow off ports 52. As the piston assembly 30 travels downwardly in a compression stroke the pressure on the compression side of the piston assembly 30 will tend to keep the poppet valves 56 closed.

At the beginning of a rebound stroke, when the piston assembly 30 is traveling upwardly, the poppet valves 54, 56 are held in a seated position by the star spring 58. As the piston continues to move upwardly, fluid pressure will act upon the exposed end of the poppet valve 54 tending to keep it closed. The same fluid pressure will also act upon the end of the rebound blow off poppet valve 56 tending to open it. However, movement in an upward direction compresses the spring 64 which is transmitted as a force through the star spring 58 tending to close the poppet valve 56. The greater the deflection of the piston 30 towards the upper end of the tube 12, the greater is the compressive force exerted by coil spring 64 to close the rebound blow off ports 52.

Thus the pressure required within the shock absorber to pass fluid through the control orifices of the piston assembly 30 must be much greater when the piston assembly 30 is in an extreme deflection situation whether it be rebound or jounce. This means that during normal operation when the piston assembly 30 is reciprocating in the mid range of the tube 12 only mild control will be exerted upon the passage of fluid through the respective control ports 50, 52. However, if the piston reaches either end of the tube 12 in its deflection, great resistance will be exerted against further movement in that direction.

The foregoing description constitutes the preferred embodiment of the present invention. However, it is to be understood that possible modifications and alternate arrangements may occur to those skilled in the art which will come within the scope and spirit of the appended claims.

I claim:
1. A hydraulic shock absorber having a pressure tube and a valved piston assembly reciprocable therein, said assembly having at least one control orifice, valve means closing said orifice, a spring member tending to force said means into a closed condition, a second spring interconnecting between said first spring and a point fixed relative to said tube, said second spring exerting a force on said valve means proportional to the position of said piston in said tube.

2. A hydraulic shock absorber having a pressure tube and a valved piston assembly reciprocable therein, said assembly having rebound and jounce control orifices, valve means closing said orifices, a spring member tending to force said means into a closed condition, a second spring interconnecting between said first spring and a point fixed relative to said tube, said second spring exerting a force on said valve means proportional to the position of said piston in said tube.

3. The combination of claim 2 wherein said spring member has a generally star shape.

4. The combination of claim 2 wherein said spring member has a plurality of circumferentially arranged fingers each engaging one of said valve means, the closing forces exerted by said fingers on said valve means being in opposite direction for said rebound and jounce orifices.

5. The combination of claim 4 wherein said spring member is movable relative to said piston assembly in response to pressure by said second spring.

6. A hydraulic shock absorber having a pressure tube and a valved piston assembly reciprocable therein, a closure member for said tube, said assembly having rebound and jounce control orifices, valve means closing said orifices, a spring member tending to force said means into a closed condition, a second spring interconnecting said first spring and said closure member, said second spring exerting a force on said first spring proportional to the position of said piston in said tube.

7. A fluid shock absorber having rebound and jounce chambers, movable piston means interposed between said chambers and adapted to control fluid flow from one of said chambers to the other, said means including a plate having rebound and jounce ports, poppet valve elements adapted to control fluid flow through said ports, said elements including head portions sealing said ports and stem portions extending in a common direction, a leaf spring device suspended between said stem portions and adapted to maintain said head portions in a normally closed position.

8. A fluid shock absorber having a pressure tube and piston means reciprocable within said pressure tube, said piston means dividing said tube into jounce and rebound chambers and adapted to control the flow of fluid from one of said chambers to the other, said means including jounce and rebound ports, valve elements adapted to control the flow of fluid through said ports, a spring device interconnecting said elements and adapted to maintain them in a normally closed position, biasing means connected to said device and adapted to vary the closing force exerted by said device upon said elements proportional to the position of said piston means in said pressure tube.

9. A fluid hydraulic shock absorber having a pressure tube and piston means reciprocable within said pressure tube, said piston means dividing said tube into jounce and rebound chambers and adapted to control the flow of fluid from one of said chambers to the other, said means including jounce and rebound ports, valve elements adapted to control the flow of fluid through said ports, a spring device interconnecting said elements and adapted to maintain them in a normally closed position, biasing means connected to said device and adapted to vary the closing force exerted by said device upon said elements in response to movement of said piston in said pressure tube.

References Cited in the file of this patent

UNITED STATES PATENTS

| | | |
|---|---|---|
| 1,444,248 | Hoffman | Feb. 6, 1923 |
| 1,833,939 | Gibbs | Dec. 1, 1931 |
| 2,496,952 | Mercier | Feb. 7, 1950 |
| 2,648,405 | Palmer | Aug. 11, 1953 |

FOREIGN PATENTS

| | | |
|---|---|---|
| 877,559 | Germany | Dec. 14, 1953 |
| 1,096,528 | France | Feb. 2, 1955 |
| 71,503 | France | July 15, 1959 |